(12) United States Patent
Guo et al.

(10) Patent No.: US 9,236,995 B2
(45) Date of Patent: Jan. 12, 2016

(54) METHOD AND DEVICE FOR SENDING AGGREGATED CQI

(75) Inventors: Senbao Guo, Shenzhen (CN); Yunfeng Sun, Shenzhen (CN); Junfeng Zhang, Shenzhen (CN); Yu Ngok Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/369,536

(22) PCT Filed: Jul. 2, 2012

(86) PCT No.: PCT/CN2012/078067
§ 371 (c)(1),
(2), (4) Date: Jun. 27, 2014

(87) PCT Pub. No.: WO2013/097441
PCT Pub. Date: Jul. 4, 2013

(65) Prior Publication Data
US 2014/0315563 A1 Oct. 23, 2014

(30) Foreign Application Priority Data
Dec. 28, 2011 (CN) .......................... 2011 1 0446490

(51) Int. Cl.
*H04L 5/00* (2006.01)
*H04L 1/00* (2006.01)

(52) U.S. Cl.
CPC ............ *H04L 5/0057* (2013.01); *H04L 1/0026* (2013.01); *H04L 1/0027* (2013.01); *H04L 1/0028* (2013.01)

(58) Field of Classification Search
CPC ... H04L 5/0035; H04L 1/0026; H04L 5/0073; H04L 15/0057; H04W 72/1231; H04W 24/08; H04W 72/0446; H04J 11/0053
USPC ........ 455/450, 422.1; 370/252, 329, 330, 332
See application file for complete search history.

(56) References Cited

U.S. PATENT DOCUMENTS

| | | | |
|---|---|---|---|
| 2013/0148515 A1* | 6/2013 | Ribeiro et al. | 370/252 |
| 2014/0241201 A1* | 8/2014 | Kim et al. | 370/252 |

*Primary Examiner* — Phuoc H Doan
(74) *Attorney, Agent, or Firm* — Jenkins, Wilson, Taylor & Hunt, P.A.

(57) ABSTRACT

A method and device for sending an aggregated CQI are provided by the disclosure. The method includes a terminal side receiving CSI-RS configuration information and/or interference measurement information sent from a base station side, the terminal side determining a sending sequence of aggregated CQI of each aggregated CSI-RS configuration resource and/or interference measurement resource according to a receiving sequence of the CSI-RS configuration information and/or interference measurement information, wherein each aggregated CSI-RS configuration resource and/or interference measurement resource is aggregated of at least one configuration CSI-RS configuration resource and/or interference measurement resource corresponding to the CSI-RS configuration information and/or interference measurement information, the terminal side sending the aggregated CQI to the base station according to the sending sequence. The disclosure resolves the problem in related art that the base station side cannot acquire the channel state of the terminal side accurately due to the fact that the base station side cannot acquire the CSI-RS configuration resource and/or interference measurement resource fed back by the terminal side corresponding to the aggregated CQI, thereby the interference between cells is reduced, and the throughput of system is improved.

22 Claims, 3 Drawing Sheets

METHOD AND DEVICE FOR SENDING AGGREGATED CQI

TECHNICAL FIELD

The disclosure relates to the communication field, and in particular, to a method and device for sending an aggregated channel quality indication (CQI), and also to a method and device for determining the constituent of an aggregated channel state information reference signal CSI-RS (CSI-RS) configuration resource.

BACKGROUND

After the long term evolution (LTE) system has gone through several releases of R8/9/10, R11 technology will be researched in the future. Currently, some R8 products are gradually commercially available, and R9 and R10 products need to be further planned.

After having gone through R8 and R9 stages, R10 adds many new properties on the basis of the former, for example, pilot frequency properties such as DMRS (Demodulation Reference Signal), CSI-RS (Channel State Information Reference Signal), transmission and feedback properties such as 8 antenna support and so on, especially eICIC (enhanced Inter-Cell Interference Cancellation) technology takes into account the interference avoidance technology among cells on the basis of taking into account R8/9 ICIC. For the technology which solves the interference problem among cells, at the initial stage of R10, cell interference avoidance in a homogeneous network is mainly taken into account, wherein what are mainly taken into account are eICIC technology and CoMP (Coordinated Multi-point) technology. Just as its name implies, CoMP is that a plurality of CSI-RS configuration resources and/or interference measurement resources coordinate to send data to one or more UE in the same time frequency resources or different time frequency resources. CoMP technology can reduce inter-cell interference, improve cell edge throughput and enlarge cell coverage. However, since the situation where the homogenous network introduces more scenarios is taken into account at the later of discussion, in view of the complexity of CoMP technology and the temporal limitation of R10 discussion, finally it is decided not to introduce additional CoMP standardization contents at R10 stage, however, design can be made by taking into account the demand of the CoMP part when designing CSI-RS, and therefore, CoMP technology is not discussed further after 60 bis conference.

At the initial R11 discussion SI (study item) stage, a unified evaluation architecture is determined by planning scenarios and various transmission technologies of CoMP, and it is proved that CoMP technology can obtain significant performance gain after two stages of CoMP evaluation. Recently completed CoMP SI conclusions are that it needs to further research JT (Joint Transmission), DPS (Dynamic Point Selection) with/without muting, CS (Coordinated Scheduling) with/without muting, CB (Coordinated Beamforming) in CoMP technology.

Before researching various technologies of CoMP, it needs to first take into account CoMP technology has what differences for R8/9/10 technologies, which includes how the control signalling of CoMP supports the notification of a CoMP measurement set, how to support the demands of different transmission technologies of CoMP and how a UE measures and reports the CSI (Channel State Information) and so on of a plurality of CSI-RS configuration resources and/or interference measurement resources. How a UE measures and reports the CSIs of a plurality of CSI-RS configuration resources and/or interference measurement resources is one of the primary problems to be solved. In the current discussion, the feedback of CoMP can be mainly divided into periodical feedback and non-periodical feedback, and aggregated channel information feedback and non-aggregated channel information feedback. The so-called aggregated channel information feedback refers to that the channel information about a plurality of CSI-RS configuration resources and/or interference measurement resources are aggregated into one piece of channel information of CSI-RS configuration resource and/or interference measurement resource for global feedback. For example, a measurement set contains two CSI-RS configuration resources and/or interference measurement resources, wherein the channel information about CSI-RS configuration resource and/or interference measurement resource 1 is H1, the channel information about CSI-RS configuration resource and/or interference measurement resource 2 is H2, and at this moment, the UE first aggregates the channel information about two CSI-RS configuration resources and/or interference measurement resources into a large piece of channel information, expressed with H=[H1; H2], and then measurement relevant calculation and feedback are performed. Non-aggregated channel information feedback can also be divided into independent single cell feedback and independent single cell feedback plus inter-cell correction information. The so-called independent single cell feedback refers to independently performing measurement relevant calculation and feedback according to the channel information about each CSI-RS configuration resource and/or interference measurement resource. The so-called independent single cell feedback plus inter-cell correction information refers to independently performing measurement relevant calculation according to the channel information about each CSI-RS configuration resource and/or interference measurement resource, and calculating the phase and/or amplitude information about each CSI-RS configuration resource and/or interference measurement resource and performing feedback. For feedback whereby aggregated channel information includes an aggregated CQI, aggregated CQI refers to that the CQI fed back by the UE side corresponds to the aggregated CQI for measuring one or more pieces of CSI-RS configuration information and/or interference measurement resource information, and the UE finds the time frequency location of a corresponding CSI-RS using a plurality of pieces of CSI-RS configuration information and/or interference measurement resource information, so as to perform measurement and obtain precoding weight information and obtain interference information using other pilot frequencies and then perform calculation, and at this moment, the UE assumes that there are CSI-RS configuration resources and/or interference measurement resources corresponding to one or more pieces of CSI-RS configuration information and/or interference measurement resource information sending data thereto, thus obtaining a CQI value corresponding to the joint transmission of the plurality of CSI-RS configuration resources and/or interference measurement resources. Since one aggregated CQI may correspond to an aggregation for measuring one or more pieces of CSI-RS configuration information and/or interference measurement resource information, for example, a measurement set may contain 3 pieces of CSI-RS configuration information and/or interference measurement resource information, and at this moment, there are 3 possibilities for aggregating one piece of CSI-RS configuration information and/or interference measurement resource information, there are 3 possibilities for aggregating two pieces of CSI-RS configuration information and/or interference measurement resource information, and there is one possibility for aggregating one piece of CSI-RS configuration information and/or interference measurement resource information, totally 7 possibilities, and therefore, there are many possibilities for an aggregated CQI, each possibility can be referred to as an aggregation possibility, that is, an aggregated CSI-RS configuration resource and/or interference measurement resource is aggregated of at least one configuration CSI-RS configuration resource and/or interference measurement resource, and the current constituent manner is referred to as aggregation possibility.

For traditional R8/R9/R10, a user merely needs to feed back the CSI of the serving cell, and therefore, over the same carriers, it merely needs to take into account single cell capacity for periodical feedback and non-periodical feedback, especially for a PUCCH, it merely needs to optimize the feedback of a single cell. Currently, taking into account coding and HARQ (Hybrid Adaptive Request Repeat) bit number and so on, for one UE, at most 11 bit CSI feedback is supported in one PUCCH (Physical Uplink Control Channel) uplink subframe. The constituent of 11 bits at most may take into account 4-bit PMI (Precoding Matrix Indicator) and two code word 7-bit CQI (Channel Quality Indicator) (taking into account the differential feedback of the CQIs among different code words). Since CoMP needs to take into account the CSI for a plurality of cells, it needs to have N*11-bit PUCCH capacity capability, however, the current PUCCH capacity cannot meet this requirement, a rational feedback solution is needed to solve the problem of insufficient PUCCH capacity. It is easily conceivable of compressing the feedback signalling, however, CoMP has relatively high requirements on the accuracy of CSI, especially, JT even JT-MU proposes relatively high requirements on the accuracy of CSI, and therefore, the performance loss caused by compression may lead to the decreasing of CoMP performance gain. Another consideration is to improve the capacity of the PUCCH, and this requires to redesign the feedback format of the PUCCH, which will inevitably bring significant standardization efforts. If it is taken into account the feedback requirements for CSI among different modes of CoMP and ensure adaptive switching among different modes, this feedback design may be more complicated. Thus, in discussion, it is taken into account information among CSI-RS configuration resources and/or interference measurement resources which can ensure the flexible switching of coordinated sending modes and/or introduce the concept of aggregated CQI. In a recent conference, it is discussed that the aggregated CQI can obtain and introduce performance similar to information among CSI-RS configuration resources and/or interference measurement resources+aggregated CQI, at this moment, no additional feedback of information among CSI-RS configuration resources and/or interference measurement resources is introduced, and currently, the conference still discusses whether to take into account the feedback of information among additional CSI-RS configuration resources and/or interference measurement resources. However, the two solutions mentioned above take into account the concept of aggregated CQI, and for the concept of aggregated CQI, it needs to feed back a CQI value generated by the aggregation of a plurality of CSI-RS configuration resources and/or interference measurement resources, the number of aggregated CSI-RS configuration resources and/or interference measurement resources can be a combination of any number of CSI-RS configuration resources and/or interference measurement resources in all the CSI-RS configuration resources and/or interference measurement resources in the measurement set, for example, the measurement set includes 6 CSI-RS configuration resources and/or interference measurement resources, at this moment, possible combinations include 63 situations, and if it is taken into account to limit the maximum number of CSI-RS configuration resources and/or interference measurement resources, the combinations include 41 possibilities. If the UE feeds back a plurality of CQIs in one feedback or feeds back a plurality of aggregated CQIs of various situations in a plurality of feedbacks, how the base station side learns the aggregated CQI fed back by the UE correspond to the combination of which CSI-RS configuration resources and/or interference measurement resources, this point needs to be specified uniformly at the base station side and the UE side, otherwise, the base station side cannot learn the received aggregated CQI correspond to the combination of which CSI-RS configuration resources and/or interference measurement resources.

Aiming at the problem mentioned above, no effective solution has been presented.

SUMMARY

The disclosure provides a method and device for sending an aggregated CQI, so as to solve the technical problem in the relevant art that the base station side cannot learn the combination of the CSI-RS configuration resources and/or interference measurement resources corresponding to the aggregated CQI fed back by the terminal side and thus it causes the fact that the base station side cannot correctly learn the channel state of the terminal side.

According to one aspect of the disclosure, a method for sending an aggregated CQI is provided, including a terminal side receiving channel state information reference signal (CSI-RS) configuration information and/or interference measurement information sent from a base station side; the terminal side determining a sending sequence of an aggregated CQI of each aggregated CSI-RS configuration resource and/or interference measurement resource according to a receiving sequence of the CSI-RS configuration information and/or interference measurement information, wherein each aggregated CSI-RS configuration resource and/or interference measurement resource is aggregated of at least one a configuration CSI-RS configuration resource and/or interference measurement resource corresponding to the CSI-RS configuration information and/or interference measurement information; and the terminal side sending the aggregated CQI to the base station according to the sending sequence.

Preferably, the terminal side sending the aggregated CQI to the base station according to the sending sequence includes: the terminal side generating an index corresponding to each aggregated CQI according to the sending sequence; the terminal side performing selection in the aggregated CQI according to a preset condition; the terminal side sending to the base station side an aggregated CQI meeting the preset condition and the index corresponding to the aggregated CQI.

Preferably, the preset condition includes at least one of the following: a transmission quality of the aggregated CQI is not lower than a transmission quality threshold; and a throughput of the terminal side is not lower than a throughput threshold.

Preferably, after the terminal side sends to the base station side the aggregated CQI meeting the preset condition and the index corresponding to the aggregated CQI, the method further includes: the base station side receiving the aggregated CQI meeting the preset condition and the index corresponding to the aggregated CQI; the base station side searching, in a receiving sequence list of aggregated CQIs pre-stored locally, for the aggregated CSI-RS configuration resource and/or interference measurement resource corresponding to the index, and determining constituent of the aggregated CSI-RS configuration resource and/or interference measurement resource, wherein the receiving sequence list stores the receiving sequence of the aggregated CQI, an index corresponding to the receiving sequence and the constituent of the aggregated CSI-RS configuration resource and/or interference measurement resource corresponding to the receiving sequence, and the receiving sequence and the sending sequence of the aggregated CQI are the same.

Preferably, after the terminal side sends the aggregated CQI to the base station according to the sending sequence, the method further includes: the base station side searching, in a receiving sequence list of aggregated CQIs pre-stored locally, for the constituent of the aggregated CSI-RS configuration resource and/or interference measurement resource corresponding to the aggregated CQI according to the sending sequence of the aggregated CQI; wherein the receiving sequence list stores the receiving sequence of the aggregated CQI and the constituent of the aggregated CSI-RS configuration resource and/or interference measurement resource corresponding to the receiving sequence, and the receiving sequence and the sending sequence of the aggregated CQI are the same.

Preferably, the terminal side determining the sending sequence of the aggregated CQI of each aggregated CSI-RS configuration resource and/or interference measurement resource according to the receiving sequence of the CSI-RS configuration information and/or interference measurement information includes: the terminal side determining the sending sequence of the aggregated CQI of each aggregated CSI-RS configuration resource and/or interference measurement resource using a preset algorithm according to the receiving sequence of the CSI-RS configuration information and/or interference measurement information and the number of pieces of the CSI-RS configuration information and/or interference measurement information.

Preferably, the sending sequence of the aggregated CQI is calculated according to the following formula:

$$r = \sum_{j=0}^{i-1}\binom{N-s_j}{i-j} + \sum_{k=0}^{i-1}\binom{N}{k} - 1, \{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N}\binom{N}{i} - 1\right\}$$

or, $$r = \binom{N}{i} + \sum_{k=0}^{i-1}\binom{N}{k} - \sum_{j=0}^{i-1}\binom{N-s_j}{i-j} - 2, \{s_j\}_{j=0}^{i-1}, 1 \leq s_j \leq N,$$

$$s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N}\binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i - 1, \binom{x}{y}$$

represents $C_x^y$, that is, the number of combinations of selecting y elements in x elements, and r is the sending sequence index corresponding to the aggregated CQI.

Preferably, the sending sequence of the aggregated CQI is: a sequence from 0 to $$\sum_{i=1}^{N}\binom{N}{i} - 1,$$

where N is the number of pieces of the CSI-RS configuration information and/or interference measurement information, i is the number of CSI-RS configuration resources and/or interference measurement resources for measurement in the aggregated CSI-RS configuration resources and/or interference measurement resources represented by the aggregated CQI.

According to another aspect of the disclosure, a method for determining constituent of a channel state information reference signal (CSI-RS) configuration resource and/or interference measurement resource is provided, including: a base station side receiving an aggregated channel quality indication (CQI) sent by a terminal side; the base station side searching, in a receiving sequence list of aggregated CQIs pre-stored locally, for a corresponding aggregated CSI-RS configuration resource and/or interference measurement resource, and determining the constituent of the aggregated CSI-RS configuration resource and/or interference measurement resource; wherein the receiving sequence list stores a receiving sequence of the aggregated CQI and the constituent of the aggregated CSI-RS configuration resource and/or interference measurement resource corresponding to the receiving sequence, and the receiving sequence and a sending sequence of the aggregated CQI are the same.

Preferably, when the receiving sequence list also stores an index corresponding to the receiving sequence of the aggregated CQI, the base station receiving the aggregated CQI sent by the terminal side includes: the base station side receiving the aggregated CQI sent by the terminal side and the index corresponding to the aggregated CQI; the base station side determining the constituent of the aggregated CSI-RS configuration resource and/or interference measurement resource corresponding to the aggregated CQI includes: the base station side searching, in the receiving sequence list, for the receiving sequence of the aggregated CQI corresponding to the index according to the index corresponding to the aggregated CQI sent by the terminal side, and determining the constituent of the aggregated CSI-RS configuration resource and/or interference measurement resource corresponding to the aggregated CQI.

Preferably, the receiving sequence of the aggregated CQI in the receiving sequence list is determined according to the following steps: the base station side determining the receiving sequence of the aggregated CQI of each aggregated CSI-RS configuration resource and/or interference measurement resource using a preset algorithm according to the sending sequence of the CSI-RS configuration information and/or interference measurement information and the number of pieces of the CSI-RS configuration information and/or interference measurement information.

Preferably, the receiving sequence of the aggregated CQI is calculated according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N} \binom{N}{i} - 1\right\};$$

or, $$r = \binom{N}{i} + \sum_{k=0}^{i-1} \binom{N}{k} - \sum_{j=0}^{i-1} \binom{N-s_j}{i-j} - 2, \{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N} \binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is a sending sequence index corresponding to the aggregated CQI.

According to still another aspect of the disclosure, a device for sending an aggregated channel quality indication (CQI) is provided at a terminal side, the device include: a first receiving module configured to receive channel state information reference signal (CSI-RS) configuration information and/or interference measurement information sent from a base station side; a first determination module configured to determine a sending sequence of an aggregated CQI of each aggregated CSI-RS configuration resource and/or interference measurement resource according to a receiving sequence of the CSI-RS configuration information and/or interference measurement information, wherein each aggregated CSI-RS configuration resource and/or interference measurement resource is aggregated of at least one configuration CSI-RS configuration resource and/or interference measurement resource corresponding to the CSI-RS configuration information and/or interference measurement information; and a sending module configured to send the aggregated CQI to the base station side according to the sending sequence.

Preferably, the sending module includes: a generation unit configured to generate an index corresponding to each aggregated CQI according to the sending sequence; a selection unit configured to perform selection according to a preset condition in the aggregated CQI, wherein the preset condition includes at least one of the following: a transmission quality of the aggregated CQI is not lower than a transmission quality threshold; and a throughput of the terminal side is not lower than a throughput threshold; a sending unit configured to send to the base station side an aggregated CQI meeting the preset condition and an index corresponding to the aggregated CQI.

Preferably, the device further includes: a search module configured to search, in a receiving sequence list of aggregated CQIs pre-stored locally, for constituent of the aggregated CSI-RS configuration resource and/or interference measurement resource corresponding to the aggregated CQI according to the sending sequence of the aggregated CQI; wherein the receiving sequence list stores the receiving sequence of the aggregated CQI and the constituent of the aggregated CSI-RS configuration resource and/or interference measurement resource corresponding to the receiving sequence, and the receiving sequence and the sending sequence of the aggregated CQI are the same.

Preferably, the first determination module is further configured to determine the sending sequence of the aggregated CQI of each aggregated CSI-RS configuration resource and/or interference measurement resource using a preset algorithm according to the receiving sequence of the CSI-RS configuration information and/or interference measurement information and the number of pieces of the CSI-RS configuration information and/or interference measurement information.

Preferably, the first determination module is further configured to calculate the sending sequence of the aggregated CQI according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N} \binom{N}{i} - 1\right\}$$

or, $$r = \binom{N}{i} + \sum_{k=0}^{i-1} \binom{N}{k} - \sum_{j=0}^{i-1} \binom{N-s_j}{i-j} - 2, \{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N} \binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is the sending sequence index corresponding to the aggregated CQI.

Preferably, the first determination module is further configured to determine the sending sequence of the aggregated CQI according to the following sequence: a sequence from 0 to $$\sum_{i=1}^{N} \binom{N}{i} - 1,$$

where N is the number of pieces of the CSI-RS configuration information and/or interference measurement information, i is the number of CSI-RS configuration resources and/or interference measurement resources for measurement in the aggregated CSI-RS configuration resources and/or interference measurement resources represented by the aggregated CQI.

According to still another aspect of the disclosure, a device for determining constituent of a channel state information reference signal (CSI-RS) configuration resource and/or interference measurement resource is provided at a base station side, the device includes: a second receiving module configured to receive an aggregated channel quality indication (CQI) sent by a terminal side; a second determination module configured to search, in a receiving sequence list of aggregated CQIs pre-stored locally, for an aggregated CSI-RS configuration resource and/or interference measurement resource and determine the constituent of the aggregated CSI-RS configuration resource and/or interference measurement resource, wherein the receiving sequence list stores a receiving sequence of the aggregated CQI and the constituent of the aggregated CSI-RS configuration resource and/or interference measurement resource corresponding to the receiving sequence, and the receiving sequence and a sending sequence of the aggregated CQI are the same.

Preferably, the second receiving module is further configured to receive an aggregated CQI sent by the terminal side and an index corresponding to the aggregated CQI when the index corresponding to the aggregated CQI is further stored in the receiving sequence list; the second determination module is further configured to search, in the receiving sequence list, for the receiving sequence of the aggregated CQI corresponding to the index according to the index corresponding to the aggregated CQI sent by the terminal side, and determine the constituent of the aggregated CSI-RS configuration resource and/or interference measurement resource corresponding to the aggregated CQI.

Preferably, the second determination module is further configured to determine the receiving sequence of the aggregated CQI of each aggregated CSI-RS configuration resource and/or interference measurement resource using a preset algorithm according to the sending sequence of the CSI-RS configuration information and/or interference measurement information and the number of pieces of the CSI-RS configuration information and/or interference measurement information.

Preferably, the second determination module is further configured to calculate the receiving sequence of the aggregated CQI according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \le s_j \le N, s_j < s_{j+1}$$

$$\binom{x}{y} = \begin{cases} \binom{x}{y} & x \ge y \\ 0 & x < y \end{cases}, r \in \left\{0, \ldots, \sum_{i=1}^{N} \binom{N}{i} - 1\right\};$$

or, $$r = \binom{N}{i} + \sum_{k=0}^{i-1} \binom{N}{k} - \sum_{j=0}^{i-1} \binom{N-s_j}{i-j} - 2, \{s_j\}_{j=0}^{i-1}, 1 \le s_j \le N, s_j < s_{j+1}$$

$$\binom{x}{y} = \begin{cases} \binom{x}{y} & x \ge y \\ 0 & x < y \end{cases}, r \in \left\{0, \ldots, \sum_{i=1}^{N} \binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is the sending sequence index corresponding to the aggregated CQI.

In the disclosure, a terminal side determines the sending sequence of an aggregated CQI according to the receiving sequence of the received CSI-RS configuration information and/or interference measurement information, and at the same time the terminal side sends the aggregated CQI to a base station side according to the sending sequence, thus ensuring that the base station side can determine the aggregation classification corresponding to the aggregated CQI according to the sending sequence, solving the technical problem in the relevant art that the base station side cannot learn the combination of the CSI-RS configuration resource and/or interference measurement resource fed back by the terminal side and thus the base station side cannot correctly learn the channel state of the terminal side, achieving the purposes of reducing inter-cell interference and improving the throughput of the system.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Embodiment 1

Figure 1:
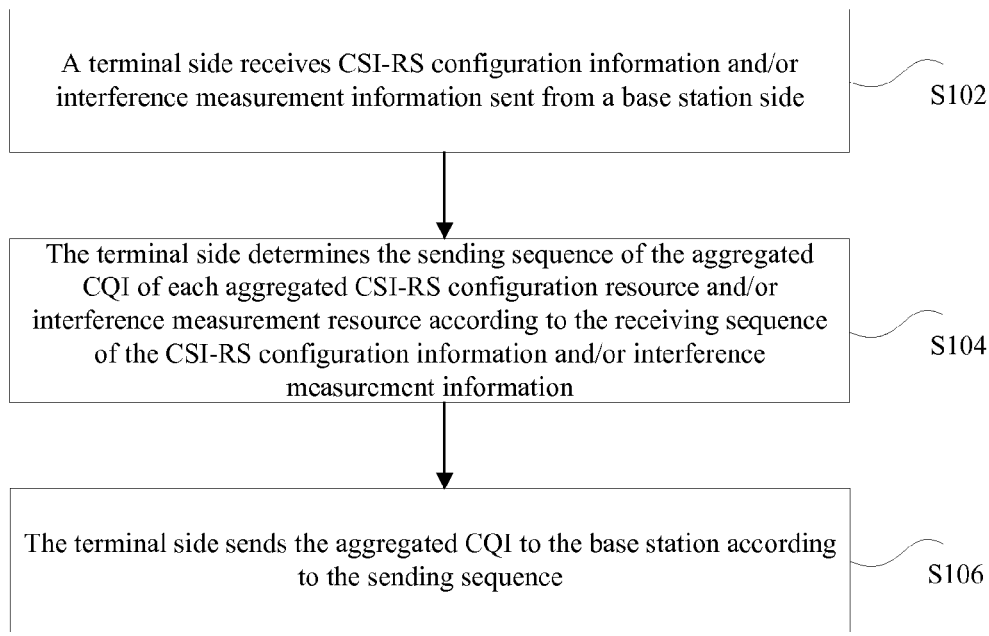
FIG. 1 is a preferred flowchart of a method for sending an aggregated CQI according to the embodiments of the disclosure.

This embodiment provides a preferred method for sending an aggregated CQI, and as shown in FIG. 1, the method includes the following steps:

step S102: a terminal side receives CSI-RS configuration information and/or interference measurement information sent from a base station side;

step S104: the terminal side determines the sending sequence of the aggregated CQI of each aggregated CSI-RS configuration resource and/or interference measurement resource according to the receiving sequence of the CSI-RS configuration information and/or interference measurement information, wherein each aggregated CSI-RS configuration resource and/or interference measurement resource is aggregated of at least one configuration CSI-RS configuration resource and/or interference measurement resource corresponding to the CSI-RS configuration information and/or interference measurement information; and step S106: the terminal side sends the aggregated CQI to the base station according to the sending sequence.

In the preferred implementation mentioned above, a terminal side determines the sending sequence of an aggregated CQI according to the receiving sequence of the received CSI-RS configuration information and/or interference measurement information, and at the same time the terminal side sends the aggregated CQI to a base station side according to the sending sequence, thus ensuring that the base station side can determine the aggregation classification corresponding to the aggregated CQI according to the sending sequence, solving the technical problem in the relevant art that the base station side cannot learn the combination of the CSI-RS configuration resource and/or interference measurement resource fed back by the terminal side and thus the base station side cannot correctly learn the channel state of the terminal side, achieving the purposes of reducing inter-cell interference and improving the throughput of the system.

The aggregated CSI-RS configuration resource and/or interference measurement resource is aggregated of at least one configuration CSI-RS configuration resource and/or interference measurement resource, and the current constituent manner is referred to as aggregation possibility, and in the following illustration, each aggregation constituent is referred to as each aggregation possibility as well.

Figure 2:
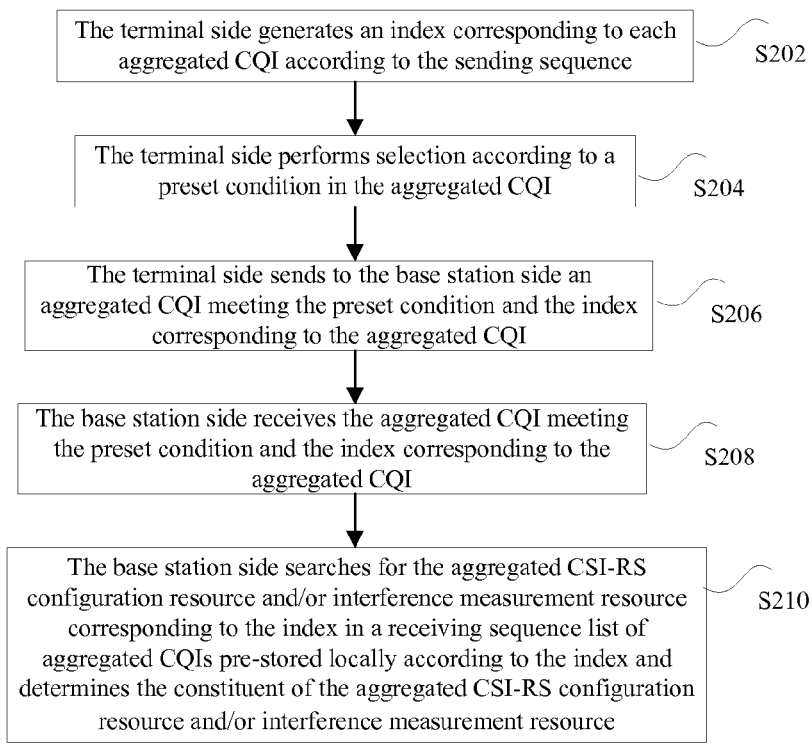
FIG. 2 is another preferred flowchart of a method for sending an aggregated CQI according to the embodiments of the disclosure.

In a preferred implementation of this embodiment, the method for the terminal side to send an aggregated CQI to the base station side according to the sending sequence can be further improved, so that the base station side can selectively send an aggregated CQI as required, and in order to achieve the above-mentioned object, in a preferred implementation of the disclosure, as shown in FIG. 2, that the terminal side sends an aggregated CQI to the base station side according to the sending sequence includes the following steps:

step S202: the terminal side generates an index corresponding to each aggregated CQI according to the sending sequence.

Step S204: the terminal side performs selection according to a preset condition in the aggregated CQI, wherein the preset condition includes at least one of the following: the transmission quality of the aggregated CQI is not lower than a transmission quality threshold; and the throughput of the terminal side is not lower than a throughput threshold.

Step S206: the terminal side sends to the base station side an aggregated CQI meeting the preset condition and the index corresponding to the aggregated CQI.

Step S208: the base station side receives the aggregated CQI meeting the preset condition and the index corresponding to the aggregated CQI.

Step S210: the base station side searches for the aggregated CSI-RS configuration resource and/or interference measurement resource corresponding to the index in a receiving sequence list of aggregated CQIs pre-stored locally and determines the constituent of the aggregated CSI-RS configuration resource and/or interference measurement resource, wherein the receiving sequence list stores the receiving sequence of the aggregated CQI, the index corresponding to the receiving sequence and the constituent of the aggregated CSI-RS configuration resource and/or interference measurement resource corresponding to the receiving sequence, and the receiving sequence and the sending sequence of the aggregated CQI are the same.

In the above-mentioned preferred implementation, the terminal side generates the index corresponding to each aggregated CQI according to the sending sequence of the base station side, thus ensuring that the base station side and the terminal side can obtain the index of the aggregated CQI based on the same sequence; the terminal side can ensure that an aggregated CQI meeting the transmission quality or throughput or other conditions and the index corresponding to the aggregated CQI to the base station, thus ensuring that the base station can correctly receive the aggregated CQI and the corresponding index fed back by the terminal side, and then the base station side can determine to obtain the aggregated CQI which is fed back according to the index corresponding to the aggregated CQI, that is, this aggregated CQI is a CQI obtained by performing aggregation measurement on which pieces of CSI-RS configuration information and/or interference measurement information. In this way, this embodiment ensures that the base station side correctly acquires all the aggregated CQIs fed back by the terminal side and the aggregation classifications corresponding to these aggregated CQIs. It can be seen that the method provided in the embodiments of the disclosure resolves the problem in related art that the base station side cannot acquire the channel state of the terminal side accurately due to the fact that the base station side cannot acquire the CSI-RS configuration resource and/or interference measurement resource fed back by the terminal side corresponding to the aggregated CQI, thereby the interference between cells is reduced, and the throughput of system is improved.

This embodiment provides a preferred method for a base station side to receive an aggregated CQI fed back by a terminal side, so that the base station side can acquire the classification of the aggregated CQI according to the index stored therein, and in order to achieve the above-mentioned object, in a preferred implementation of the disclosure, the base station searches for the constituent of the aggregated CSI-RS configuration resource and/or interference measurement resource corresponding to an aggregated CQI in a receiving sequence list of aggregated CQIs stored locally in advance according to the sending sequence of the aggregated CQI, wherein the receiving sequence list stores the receiving sequence of the aggregated CQI and the constituent of the aggregated CSI-RS configuration resource and/or interference measurement resource corresponding to the receiving sequence, and the receiving sequence and the sending sequence of the aggregated CQI are the same. In the above-mentioned preferred implementation, the base station side receives and acquires the classification of an aggregated CQI according to a receiving sequence list of aggregated CQIs stored locally in advance, and thus the base station aide can correctly acquire the value of the CQI in various aggregation cases.

On the basis of the above-mentioned preferred implementation, the disclosure also provides a preferred method for determining the sending sequence of an aggregated CQI, and in a preferred implementation of the disclosure, the terminal side determines the sending sequence of the aggregated CQI of each aggregated CSI-RS configuration resource and/or interference measurement resource using a preset algorithm according to the receiving sequence of the CSI-RS configuration information and/or interference measurement information and the number of pieces of the CSI-RS configuration information and/or interference measurement information.

Preferably, the sending sequence of the aggregated CQI can be calculated according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \le s_j \le N, s_j < s_{j+1}$$

$$\binom{x}{y} = \begin{cases} \binom{x}{y} & x \ge y \\ 0 & x < y \end{cases}, r \in \left\{0, \ldots, \sum_{i=1}^{N}\binom{N}{i} - 1\right\}$$

or, $$r = \binom{N}{i} + \sum_{k=0}^{i-1}\binom{N}{k} - \sum_{j=0}^{i-1}\binom{N-s_j}{i-j} - 2, \{s_j\}_{j=0}^{i-1}, 1 \le s_j \le N,$$

$$s_j < s_{j+1}$$

$$\binom{x}{y} = \begin{cases} \binom{x}{y} & x \ge y \\ 0 & x < y \end{cases}, r \in \left\{0, \ldots, \sum_{i=1}^{N}\binom{N}{i} - 1\right\};$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is the sending sequence index corresponding to the aggregated CQI.

In a preferred implementation of the disclosure, the sending sequence of the aggregated CQI is: a sequence from 0 to $$\sum_{i=1}^{N}\binom{N}{i} - 1,$$

where N is the number of pieces of the CSI-RS configuration information and/or interference measurement information, i is the number of CSI-RS configuration resources and/or interference measurement resources for measurement in the aggregated CSI-RS configuration resources and/or interference measurement resources represented by the aggregated CQI. For example, by way of pre-defining the sending sequence of an aggregated CQI in standard, the method can reduce the calculation amount of the terminal side and the base station side and reduce the resource consumption of the system.

Figure 3:
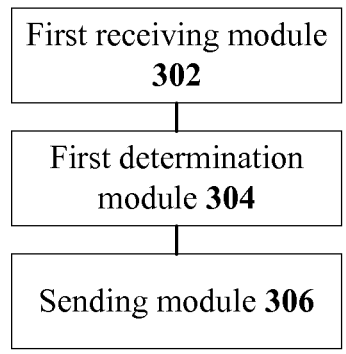
FIG. 3 is a preferred structural block diagram of a device for sending an aggregated CQI according to the embodiments of the disclosure.

The disclosure also provides a preferred device for sending an aggregated CQI provided at a terminal side, as shown in FIG. 3, the device for sending an aggregated CQI includes: a first receiving module 302 configured to receive channel state information reference signal (CSI-RS) configuration information and/or interference measurement information sent from a base station side; a first determination module 304 configured to determine the sending sequence of aggregated CQI of each aggregated CSI-RS configuration resource and/or interference measurement resource according to the receiving sequence of the CSI-RS configuration information and/or interference measurement information, wherein each aggregated CSI-RS configuration resource and/or interference measurement resource is aggregated of at least one configuration CSI-RS configuration resource and/or interference measurement resource corresponding to the CSI-RS configuration information and/or interference measurement information; and a sending module 306 configured to send the aggregated CQI to the base station side according to the sending sequence.

In the preferred implementation mentioned above, a terminal side determines the sending sequence of an aggregated CQI according to the receiving sequence of the received CSI-RS configuration information and/or interference measurement information, and at the same time the terminal side sends the aggregated CQI to a base station side according to the sending sequence, thus ensuring that the base station side can determine the aggregation classification corresponding to the aggregated CQI according to the sending sequence, solving the technical problem in the relevant art that the base station side cannot learn the combination of the CSI-RS configuration resource and/or interference measurement resource fed back by the terminal side and thus the base station side cannot correctly learn the channel state of the terminal side, achieving the purposes of reducing inter-cell interference and improving the throughput of the system.

Figure 4:
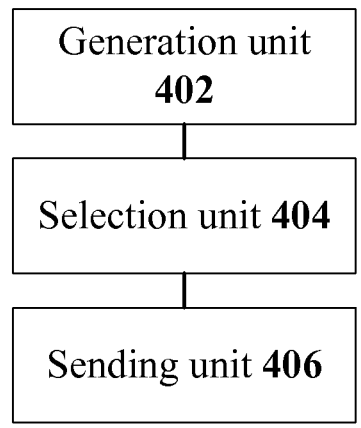
FIG. 4 is a preferred structural block diagram of a sending module of a device for sending an aggregated CQI according to the embodiments of the disclosure.

In a preferred implementation of the disclosure, as shown in FIG. 4, the sending module 306 includes: a generation unit 402 configured to generate an index corresponding to each aggregated CQI according to the sending sequence; a selection unit 404 coupled to the generation unit 402 and configured to perform selection according to a preset condition in the aggregated CQI, wherein the preset condition includes at least one of the following: the transmission quality of the aggregated CQI is not lower than a transmission quality threshold; and the throughput of the terminal side is not lower than a throughput threshold; a sending unit 406 coupled to the selection unit 404 and configured to send to the base station side an aggregated CQI meeting the preset condition and the index corresponding to the aggregated CQI.

Figure 5:
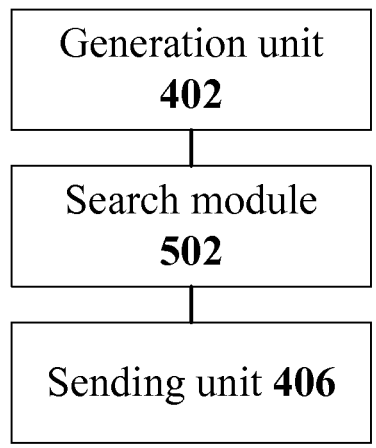
FIG. 5 is another preferred structural block diagram of a device for sending an aggregated CQI according to the embodiments of the disclosure.

In a preferred implementation of the disclosure, as shown in FIG. 5, the device for sending an aggregated CQI further includes: a search module 502 configured to search for the constituent of the aggregated CSI-RS configuration resource and/or interference measurement resource corresponding to the aggregated CQI in the receiving sequence list of aggregated CQIs pre-stored locally according to the sending sequence of the aggregated CQI; wherein the receiving sequence list stores the receiving sequence of the aggregated CQI, the index corresponding to the receiving sequence and the constituent of the aggregated CSI-RS configuration resource and/or interference measurement resource corresponding to the receiving sequence, and the receiving sequence and the sending sequence of the aggregated CQI are the same.

In a preferred implementation of the disclosure, the first determination module 304 is further configured to determine the sending sequence of the aggregated CQI of each aggregated CSI-RS configuration resource and/or interference measurement resource using a preset algorithm according to the receiving sequence of the CSI-RS configuration information and/or interference measurement information and the number of pieces of the CSI-RS configuration information and/or interference measurement information.

In a preferred implementation of the disclosure, the first determination module 304 is further configured to calculate the sending sequence of the aggregated CQI according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \leq s_j \leq N, s_j < s_{j+1}$$

$$\binom{x}{y} = \left\{ \begin{array}{ll} \binom{x}{y} & x \geq y \\ 0 & x < y \end{array} \right., r \in \left\{ 0, \ldots, \sum_{i=1}^{N} \binom{N}{i} - 1 \right\};$$

or, $$r = \binom{N}{i} + \sum_{k=0}^{i-1} \binom{N}{k} - \sum_{j=0}^{i-1} \binom{N-s_j}{i-j} - 2, \{s_j\}_{j=0}^{i-1}, 1 \leq s_j \leq N, s_j < s_{j+1}$$

-continued $$\binom{x}{y} = \left\{ \begin{array}{ll} \binom{x}{y} & x \geq y \\ 0 & x < y \end{array} \right., r \in \left\{ 0, \ldots, \sum_{i=1}^{N} \binom{N}{i} - 1 \right\};$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $s_j$ represents that the value of j is from 0 to $$i - 1, \binom{x}{y}$$

represents $C_x^y$, that is, the number of combinations of selecting y elements in x elements, and r is the sending sequence index corresponding to the aggregated CQI.

In a preferred implementation of the disclosure, the first determination module 304 is further configured to determine the sending sequence of the aggregated CQI according to the following sequence: a sequence from 0 to $$\sum_{i=1}^{N} \binom{N}{i} - 1,$$

where N is the number of pieces of the CSI-RS configuration information and/or interference measurement information, i is the number of CSI-RS configuration resources and/or interference measurement resources for measurement in the aggregated CSI-RS configuration resources and/or interference measurement resources represented by the aggregated CQI.

Embodiment 2

Figure 6:
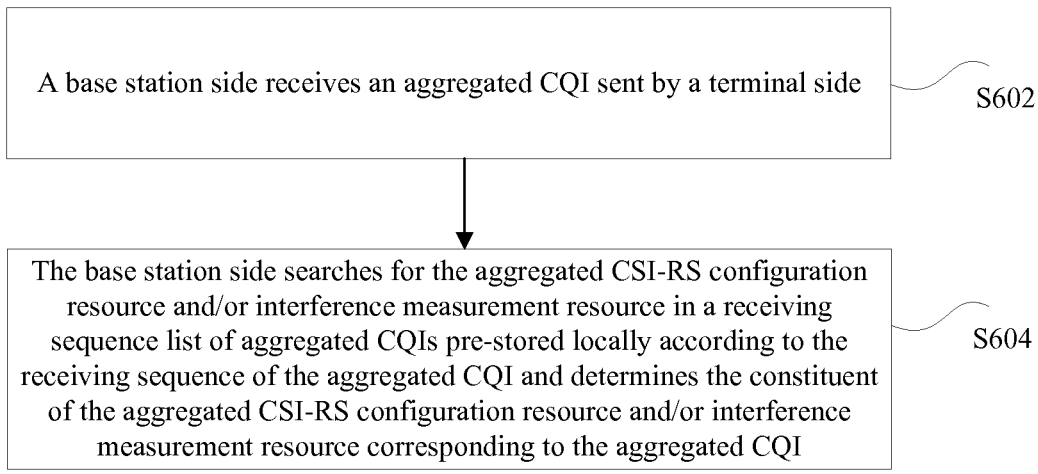
FIG. 6 is a preferred flowchart of a method for determining the constituent of an aggregated CSI-RS configuration resource and/or interference measurement resource according to the embodiments of the disclosure.

The disclosure provides a preferred method for determining the constituent of an aggregated CSI-RS configuration resource and/or interference measurement resource, and as shown in FIG. 6, the method includes the following steps:

step S602: a base station side receives an aggregated CQI sent by a terminal side;

step S604: the base station side searches for the aggregated CSI-RS configuration resource and/or interference measurement resource in a receiving sequence list of aggregated CQIs pre-stored locally according to the receiving sequence of the aggregated CQI and determines the constituent of the aggregated CSI-RS configuration resource and/or interference measurement resource corresponding to the aggregated CQI, wherein the receiving sequence list stores the receiving sequence of the aggregated CQI and the constituent of the aggregated CSI-RS configuration resource and/or interference measurement resource corresponding to the receiving sequence, and the receiving sequence and the sending sequence of the aggregated CQI are the same.

In the above-mentioned preferred implementation, the base station side searches for the corresponding aggregated CSI-RS configuration resource and/or interference measurement resource in a receiving sequence list of aggregated CQIs pre-stored locally according to the receiving sequence of the aggregated CQI and thus determines the aggregated CQI fed back by the terminal side belongs to which kind of aggregated CQI, that is, the aggregated CQI is a CQI obtained by performing aggregation measurement on which pieces of CSI-RS configuration information and/or interference measurement information. In this way, it is ensured that the base station side correctly acquires all the aggregated CQIs fed back by the terminal side and the aggregation classifications corresponding to these aggregated CQIs. The problem in related art that the base station side cannot acquire the channel state of the terminal side accurately due to the fact that the base station side cannot acquire the CSI-RS configuration resource and/or interference measurement resource fed back by the terminal side corresponding to the aggregated CQI is resolved, thereby the interference between cells is reduced, and the throughput of system is improved.

On the basis of the above-mentioned preferred implementation, the base station side receives an aggregated CQI sent by the terminal side and the index corresponding to the aggregated CQI when the index corresponding to the aggregated CQI is further stored in the receiving sequence list; the base station side searches for the receiving sequence of the aggregated CQI corresponding to the index in the receiving sequence list according to the index corresponding to the aggregated CQI sent by the terminal side, and determine the constituent of the aggregated CSI-RS configuration resource and/or interference measurement resource corresponding to the aggregated CQI.

On the basis of the above-mentioned preferred implementation, the disclosure also provides a preferred method for determining the receiving sequence of an aggregated CQI in a receiving sequence list, and in a preferred implementation of the disclosure, the base station side determines the sending sequence of the aggregated CQI of each aggregated CSI-RS configuration resource and/or interference measurement resource using a preset algorithm according to the receiving sequence of the CSI-RS configuration information and/or interference measurement information and the number of pieces of the CSI-RS configuration information and/or interference measurement information.

Preferably, the receiving sequence of the aggregated CQI is calculated according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \le s_j \le N, s_j < s_{j+1}$$

$$\binom{x}{y} = \begin{cases} \binom{x}{y} & x \ge y \\ 0 & x < y \end{cases}, r \in \left\{0, \dots, \sum_{i=1}^{N} \binom{N}{i} - 1\right\};$$

or, $$r = \binom{N}{i} + \sum_{k=0}^{i-1} \binom{N}{k} - \sum_{j=0}^{i-1} \binom{N-s_j}{i-j} - 2, \{s_j\}_{j=0}^{i-1}, 1 \le s_j \le N, s_j < s_{j+1}$$

-continued $$\binom{x}{y} = \begin{cases} \binom{x}{y} & x \ge y \\ 0 & x < y \end{cases}, r \in \left\{0, \dots, \sum_{i=1}^{N} \binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i - 1, \binom{x}{y}$$

represents $C_x^y$, that is, the number of combinations of selecting y elements in x elements, and r is the sending sequence index corresponding to the aggregated CQI.

Figure 7:
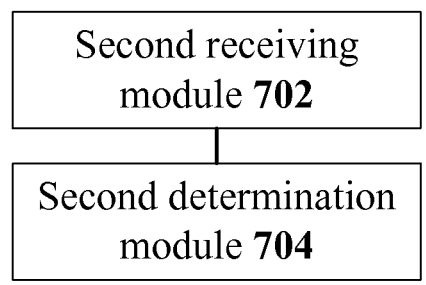
FIG. 7 is a preferred structural block diagram of a device for determining the constituent of an aggregated CSI-RS configuration resource and/or interference measurement resource according to the embodiments of the disclosure.

The disclosure also provides a preferred device for determining the constituent of an aggregated CSI-RS configuration resource and/or interference measurement resource provided at a base station side, as shown in FIG. 7, the device for determining the constituent of an aggregated CSI-RS configuration resource and/or interference measurement resource includes: a second receiving module 702 configured to receive an aggregated CQI sent by a terminal side; a second determination module 704 coupled to the second receiving module 702 and configured to search for the aggregated CSI-RS configuration resource and/or interference measurement resource corresponding to the index in a receiving sequence list of aggregated CQIs pre-stored locally according to the receiving sequence of the aggregated CQI and determine the constituent of the aggregated CSI-RS configuration resource and/or interference measurement resource corresponding to the aggregated CQI; wherein the receiving sequence list stores the receiving sequence of the aggregated CQI, the index corresponding to the receiving sequence and the constituent of the aggregated CSI-RS configuration resource and/or interference measurement resource corresponding to the receiving sequence, and the receiving sequence and the sending sequence of the aggregated CQI are the same.

In a preferred implementation of the disclosure, the second receiving module 702 is further configured to receive an aggregated CQI sent by the terminal side and the index corresponding to the aggregated CQI when the index corresponding to the aggregated CQI is further stored in the receiving sequence list; the second determination module 704 is further configured to search for the receiving sequence of the aggregated CQI corresponding to the index in the receiving sequence list according to the index corresponding to the aggregated CQI sent by the terminal side, and determine the constituent of the aggregated CSI-RS configuration resource and/or interference measurement resource corresponding to the aggregated CQI.

In a preferred implementation of the disclosure, the second determination module 704 is further configured to determine the receiving sequence of the aggregated CQI of each aggregated CSI-RS configuration resource and/or interference measurement resource using a preset algorithm according to the sending sequence of the CSI-RS configuration information and/or interference measurement information and the number of pieces of the CSI-RS configuration information and/or interference measurement information.

In a preferred implementation of the disclosure, the second determination module 704 is further configured to calculate the sending sequence of the aggregated CQI according to the following formula:

$$r = \sum_{j=0}^{i-1} \left\langle \begin{matrix} N - s_j \\ i - j \end{matrix} \right\rangle + \sum_{k=0}^{i-1} \left\langle \begin{matrix} N \\ k \end{matrix} \right\rangle - 1, \{s_j\}_{j=0}^{i-1}, 1 \le s_j \le N, s_j < s_{j+1}$$

$$\left\langle \begin{matrix} x \\ y \end{matrix} \right\rangle = \begin{cases} \begin{pmatrix} x \\ y \end{pmatrix} & x \ge y \\ 0 & x < y \end{cases}, r \in \left\{ 0, \ldots, \sum_{i=1}^{N} \begin{pmatrix} N \\ i \end{pmatrix} - 1 \right\};$$

or, $$r = \begin{pmatrix} N \\ i \end{pmatrix} + \sum_{k=0}^{i-1} \left\langle \begin{matrix} N \\ k \end{matrix} \right\rangle - \sum_{j=0}^{i-1} \left\langle \begin{matrix} N - s_j \\ i - j \end{matrix} \right\rangle - 2, \{s_j\}_{j=0}^{i-1}, 1 \le s_j \le N, s_j < s_{j+1}$$

$$\left\langle \begin{matrix} x \\ y \end{matrix} \right\rangle = \begin{cases} \begin{pmatrix} x \\ y \end{pmatrix} & x \ge y \\ 0 & x < y \end{cases}, r \in \left\{ 0, \ldots, \sum_{i=1}^{N} \begin{pmatrix} N \\ i \end{pmatrix} - 1 \right\};$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \begin{pmatrix} x \\ y \end{pmatrix}$$

represents $C_x^y$, that is, the number of combinations of selecting y elements in x elements, and r is the sending sequence index corresponding to the aggregated CQI.

Embodiment 3

The disclosure provides a preferred embodiment to further explain the disclosure, but it should be noted that this preferred embodiment is merely for better describing the disclosure and does not limit the disclosure inappropriately.

Assuming that UE1 is an R11 user, a base station side configures three pieces of CSI-RS configuration information and/or interference measurement information for UE1 via high-layer signalling or physical layer signalling, and preferably, these 3 pieces of CSI-RS configuration information and/or interference measurement information are referred to as configuration 1, configuration 2 and configuration 3, and the CSI-RS configuration information includes a corresponding identifier, the number of ports, the time-frequency location in a subframe and subframe offset and period information. When UE1 needs to feed back all possible aggregated CQIs and the base station side also requires UE1 to feed back all possible aggregated CQIs, there are 7 aggregation possibilities. For example, the aggregated CQI of configuration 1, the aggregated CQI of configuration 2, the aggregated CQI of configuration 3, the aggregated CQIs of configurations 1 and 2, the aggregated CQIs of configurations 1 and 3, the aggregated CQIs of configurations 2 and 3, and the aggregated CQIs of configurations 1, 2 and 3. The base station side and UE1 can calculate the indices of various aggregated CQIs according to the following formula (1).

$$r = \sum_{j=0}^{i-1} \left\langle \begin{matrix} N - s_j \\ i - j \end{matrix} \right\rangle + \sum_{k=0}^{i-1} \left\langle \begin{matrix} N \\ k \end{matrix} \right\rangle - 1, \quad \text{(formula 1)}$$

$$\{s_j\}_{j=0}^{i-1}, 1 \le s_j \le N, s_j < s_{j+1}$$

$$\left\langle \begin{matrix} x \\ y \end{matrix} \right\rangle = \begin{cases} \begin{pmatrix} x \\ y \end{pmatrix} & x \ge y \\ 0 & x < y \end{cases}, r \in \left\{ 0, \ldots, \sum_{i=1}^{N} \begin{pmatrix} N \\ i \end{pmatrix} - 1 \right\};$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \begin{pmatrix} x \\ y \end{pmatrix}$$

represents $C_x^y$, that is, the number of combinations of selecting y elements in x elements, and r is the sending sequence index corresponding to the aggregated CQI. Since the base station side configures 3 CSI-RS configurations, the value of N is 3.

The sending sequences corresponding to various aggregated CQIs can be calculated according to the above-mentioned formula 1:

aggregation possibility first CSI-RS configuration resource and/or interference measurement resource CQI:

$$r = \sum_{j=0}^{1-1} \begin{pmatrix} 3-1 \\ 1-0 \end{pmatrix} + \begin{pmatrix} 3 \\ 0 \end{pmatrix} - 1 = 2.$$

aggregation possibility second CSI-RS configuration resource and/or interference measurement resource CQI:

$$r = \sum_{j=0}^{1-1} \begin{pmatrix} 3-2 \\ 1-0 \end{pmatrix} + \begin{pmatrix} 3 \\ 0 \end{pmatrix} - 1 = 1.$$

aggregation possibility third CSI-RS configuration resource and/or interference measurement resource CQI:

$$r = \sum_{j=0}^{1-1}\binom{3-3}{1-0} + \binom{3}{0} - 1 = 0.$$

aggregation possibility first and second CSI-RS configuration resource and/or interference measurement resource CQIs:

$$r = \sum_{j=0}^{1-1}\binom{3-s_j}{2-j} + \sum_{k=0}^{2-1}\binom{3}{k} - 1 = 1+1+1+3-1 = 5.$$

aggregation possibility first and third CSI-RS configuration resource and/or interference measurement resource CQIs:

$$r = \sum_{j=0}^{2-1}\binom{3-s_j}{2-j} + \sum_{k=0}^{2-1}\binom{3}{k} - 1 = 1+0+1+3-1 = 4.$$

aggregation possibility second and third CSI-RS configuration resource and/or interference measurement resource CQIs:

$$r = \sum_{j=0}^{2-1}\binom{3-s_j}{2-j} + \sum_{k=0}^{2-1}\binom{3}{k} - 1 = 0+0+1+3-1 = 3.$$

aggregation possibility first, second and third CSI-RS configuration resource and/or interference measurement resource CQIs:

$$r = \sum_{j=0}^{3-1}\binom{3-s_j}{3-j} + \sum_{k=0}^{3-1}\binom{3}{k} - 1 = 0+0+0+1+3+3-1 = 6.$$

UE1 feeds back all the aggregated CQIs by taking the r value obtained from the above calculation as the feedback sequence of the aggregated CQI, for example, first feeding back aggregation possibility third CSI-RS configuration resource and/or interference measurement resource CQI, and then successively feeding back aggregation possibility second CSI-RS configuration resource and/or interference measurement resource CQI, aggregation possibility first CSI-RS configuration resource and/or interference measurement resource CQI, aggregation possibility second and third CSI-RS configuration resource and/or interference measurement resource CQIs, aggregation possibility first and third CSI-RS configuration resource and/or interference measurement resource CQIs, aggregation possibility first and second CSI-RS configuration resource and/or interference measurement resource CQIs, aggregation possibility first, second and third CSI-RS configuration resource and/or interference measurement resource CQIs. At the same time, the base station side receives various aggregated CQIs fed back by UE1 according to this sequence successively, thus obtaining various possible aggregated CQIs. Preferred calculation processes of the base station side and the terminal side can be fixed during standardization, and when the measurement set is determined, the corresponding sending sequence and index are determined as well, without performing calculation at the terminal side and the base station side every time.

Embodiment 4

The disclosure provides a preferred embodiment to further explain the disclosure, but it should be noted that this preferred embodiment is merely for better describing the disclosure and does not limit the disclosure inappropriately.

Assuming that UE1 is an R11 user, a base station side configures three pieces of CSI-RS configuration information and/or interference measurement information for UE1 via high-layer signalling or physical layer signalling, and preferably, these 3 pieces of CSI-RS configuration information and/or interference measurement information are referred to as configuration 1, configuration 2 and configuration 3, and the CSI-RS configuration information includes a corresponding identifier, the number of ports, the time-frequency location in a subframe and subframe offset and period information. When UE1 needs to feed back all possible aggregated CQIs and the base station side also requires UE1 to feed back all possible aggregated CQIs, there are 7 aggregation possibilities. For example, the aggregated CQI of configuration 1, the aggregated CQI of configuration 2, the aggregated CQI of configuration 3, the aggregated CQIs of configurations 1 and 2, the aggregated CQIs of configurations 1 and 3, the aggregated CQIs of configurations 2 and 3, and the aggregated CQIs of configurations 1, 2 and 3. The base station side and UE1 can calculate the indices of various aggregated CQIs according to the following formula (1).

$$r = \sum_{j=0}^{i-1}\binom{N-s_j}{i-j} + \sum_{k=0}^{i-1}\binom{N}{k} - 1,\quad \text{(formula 1)}$$

$$\{s_j\}_{j=0}^{i-1}, 1 \leq s_j \leq N, s_j < s_{j+1}$$

$$\binom{x}{y} = \begin{cases}\binom{x}{y} & x \geq y \\ 0 & x < y\end{cases}, r \in \left\{0, \ldots, \sum_{i=1}^{N}\binom{N}{i} - 1\right\};$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is the sending sequence index corresponding to the aggregated CQI. Since the base station side configures 3 CSI-RS configurations, the value of N is 3.

The sending sequences corresponding to various aggregated CQIs can be calculated according to the above-mentioned formula 1:

aggregation possibility first CSI-RS configuration resource and/or interference measurement resource CQI:

$$r = \sum_{j=0}^{1-1} \binom{3-1}{1-0} + \binom{3}{0} - 1 = 2.$$

aggregation possibility second CSI-RS configuration resource and/or interference measurement resource CQI $$r = \sum_{j=0}^{1-1} \binom{3-2}{1-0} + \binom{3}{0} - 1 = 1.$$

aggregation possibility third CSI-RS configuration resource and/or interference measurement resource CQI:

$$r = \sum_{j=0}^{1-1} \binom{3-3}{1-0} + \binom{3}{0} - 1 = 0.$$

aggregation possibility first and second CSI-RS configuration resource and/or interference measurement resource CQIs:

$$r = \sum_{j=0}^{2-1} \binom{3-s_j}{2-j} + \sum_{k=0}^{2-1} \binom{3}{k} - 1 = 1 + 1 + 1 + 3 - 1 = 5.$$

aggregation possibility first and third CSI-RS configuration resource and/or interference measurement resource CQIs:

$$r = \sum_{j=0}^{2-1} \binom{3-s_j}{2-j} + \sum_{k=0}^{2-1} \binom{3}{k} - 1 = 1 + 0 + 1 + 3 - 1 = 4.$$

aggregation possibility second and third CSI-RS configuration resource and/or interference measurement resource CQIs:

$$r = \sum_{j=0}^{2-1} \binom{3-s_j}{2-j} + \sum_{k=0}^{2-1} \binom{3}{k} - 1 = 0 + 0 + 1 + 3 - 1 = 3.$$

aggregation possibility first, second and third CSI-RS configuration resource and/or interference measurement resource CQIs:

$$r = \sum_{j=0}^{3-1} \binom{3-s_j}{3-j} + \sum_{k=0}^{3-1} \binom{3}{k} - 1 = 0 + 0 + 0 + 1 + 3 + 3 - 1 = 6.$$

UE1 takes the r value obtained by the above calculation as the index corresponding to the feedback sequence of all aggregated CQIs, then selects the classification of aggregated CQIs which have good channel quality or meet other preset conditions according to the values of various CQIs obtained by calculation, and feeds back the selected kinds of aggregated CQIs to the base station. Preferably, after feeding back the selected kinds of aggregated CQIs to the base station, UE1 adds a corresponding index after the aggregated CQI which is fed back to indicate this aggregated CQI corresponds to the assumption of which kind of aggregated CQI. After obtaining the aggregated CQI and the corresponding index, the base station side can learn the values of which kinds of aggregated CQIs fed back by UE1 according to this index. Preferably, the base station side stores a receiving sequence list of aggregated CQIs locally, and the base station side searches for the receiving sequence of the aggregated CQI corresponding to this index in the receiving sequence list according to the index corresponding to the aggregation sent by the terminal side and determines the constituent of the aggregated CSI-RS configuration resource and/or interference measurement resource corresponding to the aggregated CQI. Preferred calculation processes of the base station side and the terminal side can be fixed during standardization, and when the measurement set is determined, the corresponding sending sequence and index are determined as well, without performing calculation at the terminal side and the base station side every time.

Embodiment 5

The disclosure provides a preferred embodiment to further explain the disclosure, but it should be noted that this preferred embodiment is merely for better describing the disclosure and does not limit the disclosure inappropriately.

Assuming that UE1 is an R11 user, a base station side configures three pieces of CSI-RS configuration information and/or interference measurement information for UE1 via high-layer signalling or physical layer signalling, and preferably, these 3 pieces of CSI-RS configuration information and/or interference measurement information are referred to as configuration 1, configuration 2 and configuration 3, and the CSI-RS configuration information includes a corresponding identifier, the number of ports, the time-frequency location in a subframe and subframe offset and period information. When UE1 needs to feed back all possible aggregated CQIs and the base station side also requires UE1 to feed back all possible aggregated CQIs, there are 7 aggregation possibilities. For example, the aggregated CQI of configuration 1, the aggregated CQI of configuration 2, the aggregated CQI of configuration 3, the aggregated CQIs of configurations 1 and 2, the aggregated CQIs of configurations 1 and 3, the aggregated CQIs of configurations 2 and 3, and the aggregated CQIs of configurations 1, 2 and 3. The base station side and UE1 can calculate the indices of various aggregated CQIs according to the following formula (2).

$$r = \binom{N}{i} + \sum_{k=0}^{i-1} \binom{N}{k} - \sum_{j=0}^{i-1} \binom{N-s_j}{i-j} - 2, \quad \text{(formula 2)}$$

$$\{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N} \binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is the sending sequence index corresponding to the aggregated CQI. Since the base station side configures 3 CSI-RS configurations, the value of N is 3.

The sending sequences corresponding to various aggregated CQIs can be calculated according to the above-mentioned formula 2:

aggregation possibility first CSI-RS configuration resource and/or interference measurement resource CQI:

$$r = \binom{3}{1} + \sum_{k=0}^{1-1}\binom{3}{k} - \sum_{j=0}^{1-1}\binom{3-1}{1-j} - 2 = 3 + 1 - 2 - 2 = 0.$$

aggregation possibility second CSI-RS configuration resource and/or interference measurement resource CQI:

$$r = \binom{3}{1} + \sum_{k=0}^{1-1}\binom{3}{k} - \sum_{j=0}^{1-1}\binom{3-2}{1-j} - 2 = 3 + 1 - 1 - 2 = 1.$$

aggregation possibility third CSI-RS configuration resource and/or interference measurement resource CQI:

$$r = \binom{3}{2} + \sum_{k=0}^{1-1}\binom{3}{k} - \sum_{j=0}^{1-1}\binom{3-3}{1-j} - 2 = 3 + 1 - 0 - 1 - 2 = 2.$$

aggregation possibility first and second CSI-RS configuration resource and/or interference measurement resource CQIs:

$$r = \binom{3}{2} + \sum_{k=0}^{2-1}\binom{3}{k} - \sum_{j=0}^{2-1}\binom{3-s_j}{2-j} - 2 = 3 + 1 + 3 - 1 - 1 - 2 = 3.$$

aggregation possibility first and third CSI-RS configuration resource and/or interference measurement resource CQIs:

$$r = \binom{3}{2} + \sum_{k=0}^{2-1}\binom{3}{k} - \sum_{j=0}^{2-1}\binom{3-s_j}{2-j} - 2 = 3 + 1 + 3 - 1 - 0 - 2 = 4.$$

aggregation possibility second and third CSI-RS configuration resource and/or interference measurement resource CQIs:

$$r = \binom{3}{2} + \sum_{k=0}^{2-1}\binom{3}{k} - \sum_{j=0}^{2-1}\binom{3-s_j}{2-j} - 2 = 3 + 1 + 3 - 0 - 0 - 2 = 5.$$

aggregation possibility first, second and third CSI-RS configuration resource and/or interference measurement resource CQIs:

$$r = \binom{3}{3} + \sum_{k=0}^{3-1}\binom{3}{k} - \sum_{j=0}^{3-1}\binom{3-s_j}{3-j} - 2 = 1 + 1 + 3 + 3 - 0 - 0 - 0 - 2 = 6.$$

UE1 feeds back all the aggregated CQIs by taking the r value obtained from the above calculation as the feedback sequence of the aggregated CQI, for example, first feeding back aggregation possibility third CSI-RS configuration resource and/or interference measurement resource CQI, and then successively feeding back aggregation possibility second CSI-RS configuration resource and/or interference measurement resource CQI, aggregation possibility first CSI-RS configuration resource and/or interference measurement resource CQI, aggregation possibility second and third CSI-RS configuration resource and/or interference measurement resource CQIs, aggregation possibility first and third CSI-RS configuration resource and/or interference measurement resource CQIs, aggregation possibility first and second CSI-RS configuration resource and/or interference measurement resource CQIs, aggregation possibility first, second and third CSI-RS configuration resource and/or interference measurement resource CQIs. At the same time, the base station side receives various aggregated CQIs fed back by UE1 according to this sequence successively, thus obtaining various possible aggregated CQIs. Preferred calculation processes of the base station side and the terminal side can be fixed during standardization, and when the measurement set is determined, the corresponding sending sequence and index are determined as well, without performing calculation at the terminal side and the base station side every time.

Embodiment 6

The disclosure provides a preferred embodiment to further explain the disclosure, but it should be noted that this preferred embodiment is merely for better describing the disclosure and does not limit the disclosure inappropriately.

Assuming that UE1 is an R11 user, a base station side configures three pieces of CSI-RS configuration information and/or interference measurement information for UE1 via high-layer signalling or physical layer signalling, and preferably, these 3 pieces of CSI-RS configuration information and/or interference measurement information are referred to as configuration 1, configuration 2 and configuration 3, and the CSI-RS configuration information includes a corresponding identifier, the number of ports, the time-frequency location in a subframe and subframe offset and period information. When UE1 needs to feed back all possible aggregated CQIs and the base station side also requires UE1 to feed back all possible aggregated CQIs, there are 7 aggregation possibilities, For example, the aggregated CQI of configuration 1, the aggregated CQI of configuration 2, the aggregated CQI of configuration 3, the aggregated CQIs of configurations 1 and 2, the aggregated CQIs of configurations 1 and 3, the aggregated CQIs of configurations 2 and 3, and the aggregated CQIs of configurations 1, 2 and 3. The base station side and UE1 can calculate the various possible indices according to the following formula (2).

$$r = \binom{N}{i} + \sum_{k=0}^{i-1}\binom{N}{k} - \sum_{j=0}^{i-1}\binom{N-s_j}{i-j} - 2, \{s_j\}_{j=0}^{i-1}, \quad \text{(formula 2)}$$

$$1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots, \sum_{i=1}^{N}\binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is the sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is the sending sequence index corresponding to the aggregated CQI. Since the base station side configures 3 CSI-RS configurations, the value of N is 3.

The sending sequences corresponding to various aggregated CQIs can be calculated according to the above-mentioned formula 2:

aggregation possibility first CSI-RS configuration resource and/or interference measurement resource CQI:

$$r = \binom{3}{1} + \sum_{k=0}^{1-1}\binom{3}{k} - \sum_{j=0}^{1-1}\binom{3-1}{1-j} - 2 = 3 + 1 - 2 - 2 = 0.$$

aggregation possibility second CSI-RS configuration resource and/or interference measurement resource CQI:

$$r = \binom{3}{1} + \sum_{k=0}^{1-1}\binom{3}{k} - \sum_{j=0}^{1-1}\binom{3-2}{1-j} - 2 = 3 + 1 - 1 - 2 = 1.$$

aggregation possibility third CSI-RS configuration resource and/or interference measurement resource CQI:

$$r = \binom{3}{1} + \sum_{k=0}^{1-1}\binom{3}{k} - \sum_{j=0}^{1-1}\binom{3-3}{1-j} - 2 = 3 + 1 - 0 - 2 = 2.$$

aggregation possibility first and second CSI-RS configuration resource and/or interference measurement resource CQIs:

$$r = \binom{3}{2} + \sum_{k=0}^{2-1}\binom{3}{k} - \sum_{j=0}^{2-1}\binom{3-s_j}{2-j} - 2 = 3 + 1 + 3 - 1 - 1 - 2 = 3.$$

aggregation possibility first and third CSI-RS configuration resource and/or interference measurement resource CQIs:

$$r = \binom{3}{2} + \sum_{k=0}^{2-1}\binom{3}{k} - \sum_{j=0}^{2-1}\binom{3-s_j}{2-j} - 2 = 3 + 1 + 3 - 1 - 0 - 2 = 4.$$

aggregation possibility second and third CSI-RS configuration resource and/or interference measurement resource CQIs:

$$r = \binom{3}{2} + \sum_{k=0}^{2-1}\binom{3}{k} - \sum_{j=0}^{2-1}\binom{3-s_j}{2-j} - 2 = 3 + 1 + 3 - 0 - 0 - 2 = 5.$$

aggregation possibility first, second and third CSI-RS configuration resource and/or interference measurement resource CQIs:

$$r = \binom{3}{3} + \sum_{k=0}^{3-1}\binom{3}{k} - \sum_{j=0}^{3-1}\binom{3-s_j}{3-j} - 2 = 1 + 1 + 3 + 3 - 0 - 0 - 0 - 2 = 6.$$

UE1 takes the r value obtained by the above calculation as the index corresponding to the feedback sequence of all aggregated CQIs, then selects the classification of aggregated CQIs which have good channel quality or meet other preset conditions according to the values of various CQIs obtained by calculation, and feeds back the selected kinds of aggregated CQIs to the base station.

Preferably, after feeding back the selected kinds of aggregated CQIs to the base station, UE1 adds a corresponding index after the aggregated CQI which is fed back to indicate this aggregated CQI corresponds to the assumption of which kind of aggregated CQI. After obtaining the aggregated CQI and the corresponding index, the base station side can learn the values of which kinds of aggregated CQIs fed back by UE1 according to this index. Preferably, the base station side stores a receiving sequence list of aggregated CQIs locally, and the base station side searches for the receiving sequence of the aggregated CQI corresponding to this index in the receiving sequence list according to the index corresponding to the aggregated CQI sent by the terminal side and determines the constituent of the aggregated CSI-RS configuration resource and/or interference measurement resource corresponding to the aggregated CQI. Preferred calculation processes of the base station side and the terminal side can be fixed during standardization, and when the measurement set is determined, the corresponding sending sequence and index are determined as well, without performing calculation at the terminal side and the base station side every time.

From the description above, it can be seen that the disclosure achieves the following technique effects:

The base station side and the terminal side can determine the possible sequence of various aggregated CQIs by means of standardization formulas, and the terminal side uses the sequence result to calculate and feed back various possible aggregated CQIs or aggregated CQIs meeting a certain condition and the indices thereof, the base station side can use the sequence result to obtain various possible aggregated CQIs which are fed back by the terminal side or aggregated CQIs meeting a certain condition and the indices thereof, thus ensuring that the terminal side and the base station side have consistent assumption aggregation possibility knowledge.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined in the appended claims of the disclosure.

What is claimed is:

1. A method for sending an aggregated channel quality indication (CQI), comprising:
   a terminal side receiving channel state information reference signal (CSI-RS) configuration information and/or interference measurement information sent from a base station side;
   the terminal side determining a sending sequence of an aggregated CQI of each aggregated CSI-RS configuration resource and/or interference measurement resource according to a receiving sequence of the CSI-RS configuration information and/or interference measurement information, wherein each aggregated CSI-RS configuration resource and/or interference measurement resource is aggregated of at least one a configuration CSI-RS configuration resource and/or interference measurement resource corresponding to the CSI-RS configuration information and/or interference measurement information; and
   the terminal side sending the aggregated CQI to the base station according to the sending sequence.

2. The method according to claim 1, wherein the terminal side sending the aggregated CQI to the base station according to the sending sequence comprises:
   the terminal side generating an index corresponding to each aggregated CQI according to the sending sequence;
   the terminal side performing selection in the aggregated CQI according to a preset condition;
   the terminal side sending to the base station side an aggregated CQI meeting the preset condition and the index corresponding to the aggregated CQI.

3. The method according to claim 2, wherein the preset condition comprises at least one of the following: a transmission quality of the aggregated CQI is not lower than a transmission quality threshold; and a throughput of the terminal side is not lower than a throughput threshold.

4. The method according to claim 2, wherein after the terminal side sends to the base station side the aggregated CQI meeting the preset condition and the index corresponding to the aggregated CQI, the method further comprises:
   the base station side receiving the aggregated CQI meeting the preset condition and the index corresponding to the aggregated CQI;
   the base station side searching, in a receiving sequence list of aggregated CQIs pre-stored locally, for the aggregated CSI-RS configuration resource and/or interference measurement resource corresponding to the index, and determining constituent of the aggregated CSI-RS configuration resource and/or interference measurement resource, wherein the receiving sequence list stores the receiving sequence of the aggregated CQI, an index corresponding to the receiving sequence and the constituent of the aggregated CSI-RS configuration resource and/or interference measurement resource corresponding to the receiving sequence, and the receiving sequence and the sending sequence of the aggregated CQI are the same.

5. The method according to claim 1, wherein after the terminal side sends the aggregated CQI to the base station according to the sending sequence, the method further comprises:
   the base station side searching, in a receiving sequence list of aggregated CQIs pre-stored locally, for the constituent of the aggregated CSI-RS configuration resource and/or interference measurement resource corresponding to the aggregated CQI according to the sending sequence of the aggregated CQI;
   wherein the receiving sequence list stores the receiving sequence of the aggregated CQI and the constituent of the aggregated CSI-RS configuration resource and/or interference measurement resource corresponding to the receiving sequence, and the receiving sequence and the sending sequence of the aggregated CQI are the same.

6. The method according to claim 1, wherein the terminal side determining the sending sequence of the aggregated CQI of each aggregated CSI-RS configuration resource and/or interference measurement resource according to the receiving sequence of the CSI-RS configuration information and/or interference measurement information comprises:
   the terminal side determining the sending sequence of the aggregated CQI of each aggregated CSI-RS configuration resource and/or interference measurement resource using a preset algorithm according to the receiving sequence of the CSI-RS configuration information and/or or interference measurement information and the number of pieces of the CSI-RS configuration information and/or interference measurement information.

7. The method according to claim 6, wherein the sending sequence of the aggregated CQI is calculated according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \leq s_j \leq N, s_j < s_{j+1}$$

-continued $$\begin{Bmatrix} x \\ y \end{Bmatrix} = \begin{cases} \begin{pmatrix} x \\ y \end{pmatrix} & x \geq y \\ 0 & x < y \end{cases}, r \in \left\{0, \ldots \sum_{i=1}^{N} \begin{pmatrix} N \\ i \end{pmatrix} - 1\right\}$$

or, $$r = \begin{Bmatrix} N \\ i \end{Bmatrix} + \sum_{k=0}^{i-1} \begin{Bmatrix} N \\ k \end{Bmatrix} - \sum_{j=0}^{i-1} \begin{Bmatrix} N - s_j \\ i - j \end{Bmatrix} - 2, \{s_j\}_{j=0}^{i-1}, 1 \leq s_j \leq N, s_j < s_{j+1}$$

$$\begin{Bmatrix} x \\ y \end{Bmatrix} = \begin{cases} \begin{pmatrix} x \\ y \end{pmatrix} & x \geq y \\ 0 & x < y \end{cases}, r \in \left\{0, \ldots \sum_{i=1}^{N} \begin{pmatrix} N \\ i \end{pmatrix} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i - 1, \begin{pmatrix} x \\ y \end{pmatrix}$$

represents $C_x^y$, that is, the number of combinations of selecting y elements in x elements, and r is the sending sequence index corresponding to the aggregated CQI.

8. The method according to claim 6, wherein the sending sequence of the aggregated CQI is: a sequence from 0 to $$\sum_{i=1}^{N} \begin{pmatrix} N \\ i \end{pmatrix} - 1,$$

where N is the number of pieces of the CSI-RS configuration information and/or interference measurement information, i is the number of CSI-RS configuration resources and/or interference measurement resources for measurement in the aggregated CSI-RS configuration resources and/or interference measurement resources represented by the aggregated CQI.

9. A method for determining constituent of a channel state information reference signal (CSI-RS) configuration resource and/or interference measurement resource, comprising:
a base station side receiving an aggregated channel quality indication (CQI) sent by a terminal side;
the base station side searching, in a receiving sequence list of aggregated CQIs pre-stored locally, for a corresponding aggregated CSI-RS configuration resource and/or interference measurement resource, and determining the constituent of the aggregated CSI-RS configuration resource and/or interference measurement resource;
wherein the receiving sequence list stores a receiving sequence of the aggregated CQI and the constituent of the aggregated CSI-RS configuration resource and/or interference measurement resource corresponding to the receiving sequence, and the receiving sequence and a sending sequence of the aggregated CQI are the same.

10. The method according to claim 9, wherein when the receiving sequence list also stores an index corresponding to the receiving sequence of the aggregated CQI, the base station receiving the aggregated CQI sent by the terminal side comprises:
the base station side receiving the aggregated CQI sent by the terminal side and the index corresponding to the aggregated CQI;
the base station side determining the constituent of the aggregated CSI-RS configuration resource and/or interference measurement resource corresponding to the aggregated CQI comprises:
the base station side searching, in the receiving sequence list, for the receiving sequence of the aggregated CQI corresponding to the index according to the index corresponding to the aggregated CQI sent by the terminal side, and determining the constituent of the aggregated CSI-RS configuration resource and/or interference measurement resource corresponding to the aggregated CQI.

11. The method according to claim 9, wherein the receiving sequence of the aggregated CQI in the receiving sequence list is determined according to the following steps: the base station side determining the receiving sequence of the aggregated CQI of each aggregated CSI-RS configuration resource and/or interference measurement resource using a preset algorithm according to the sending sequence of the CSI-RS configuration information and/or interference measurement information and the number of pieces of the CSI-RS configuration information and/or interference measurement information.

12. The method according to claim 11, wherein the receiving sequence of the aggregated CQI is calculated according to the following formula:

$$r = \sum_{j=0}^{i-1} \begin{Bmatrix} N - s_j \\ i - j \end{Bmatrix} + \sum_{k=0}^{i-1} \begin{Bmatrix} N \\ k \end{Bmatrix} - 1, \{s_j\}_{j=0}^{i-1}, 1 \leq s_j \leq N, s_j < s_{j+1}$$

$$\begin{Bmatrix} x \\ y \end{Bmatrix} = \begin{cases} \begin{pmatrix} x \\ y \end{pmatrix} & x \geq y \\ 0 & x < y \end{cases}, r \in \left\{0, \ldots \sum_{i=1}^{N} \begin{pmatrix} N \\ i \end{pmatrix} - 1\right\};$$

or, $$r = \begin{Bmatrix} N \\ i \end{Bmatrix} + \sum_{k=0}^{i-1} \begin{Bmatrix} N \\ k \end{Bmatrix} - \sum_{j=0}^{i-1} \begin{Bmatrix} N - s_j \\ i - j \end{Bmatrix} - 2, \{s_j\}_{j=0}^{i-1}, 1 \leq s_j \leq N, s_j < s_{j+1}$$

$$\begin{Bmatrix} x \\ y \end{Bmatrix} = \begin{cases} \begin{pmatrix} x \\ y \end{pmatrix} & x \geq y \\ 0 & x < y \end{cases}, r \in \left\{0, \ldots \sum_{i=1}^{N} \begin{pmatrix} N \\ i \end{pmatrix} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i-1, \binom{x}{y}$$

represents $C_x^y$, that is, the number of combinations of selecting y elements in x elements, and r is a sending sequence index corresponding to the aggregated CQI.

13. A device for sending an aggregated channel quality indication (CQI) provided at a terminal side, wherein the device comprise:
a first receiving module configured to receive channel state information reference signal (CSI-RS) configuration information and/or interference measurement information sent from a base station side;
a first determination module configured to determine a sending sequence of an aggregated CQI of each aggregated CSI-RS configuration resource and/or interference measurement resource according to a receiving sequence of the CSI-RS configuration information and/or interference measurement information, wherein each aggregated CSI-RS configuration resource and/or interference measurement resource is aggregated of at least one configuration CSI-RS configuration resource and/or interference measurement resource corresponding to the CSI-RS configuration information and/or interference measurement information; and
a sending module configured to send the aggregated CQI to the base station side according to the sending sequence.

14. The device according to claim 13, wherein the sending module comprises:
a generation unit configured to generate an index corresponding to each aggregated CQI according to the sending sequence;
a selection unit configured to perform selection according to a preset condition in the aggregated CQI, wherein the preset condition comprises at least one of the following:
a transmission quality of the aggregated CQI is not lower than a transmission quality threshold; and a throughput of the terminal side is not lower than a throughput threshold;
a sending unit configured to send to the base station side an aggregated CQI meeting the preset condition and an index corresponding to the aggregated CQI.

15. The device according to claim 13, further comprising:
a search module configured to search, in a receiving sequence list of aggregated CQIs pre-stored locally, for constituent of the aggregated CSI-RS configuration resource and/or interference measurement resource corresponding to the aggregated CQI according to the sending sequence of the aggregated CQI;
wherein the receiving sequence list stores the receiving sequence of the aggregated CQI and the constituent of the aggregated CSI-RS configuration resource and/or interference measurement resource corresponding to the receiving sequence, and the receiving sequence and the sending sequence of the aggregated CQI are the same.

16. The device according to claim 13, wherein the first determination module is further configured to determine the sending sequence of the aggregated CQI of each aggregated CSI-RS configuration resource and/or interference measurement resource using a preset algorithm according to the receiving sequence of the CSI-RS configuration information and/or interference measurement information and the number of pieces of the CSI-RS configuration information and/or interference measurement information.

17. The device according to claim 16, wherein the first determination module is further configured to calculate the sending sequence of the aggregated CQI according to the following formula:

$$r = \sum_{j=0}^{i-1} \binom{N-s_j}{i-j} + \sum_{k=0}^{i-1} \binom{N}{k} - 1, \{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots \sum_{i=1}^{N} \binom{N}{i} - 1\right\}$$

or, $$r = \binom{N}{i} + \sum_{k=0}^{i-1} \binom{N}{k} - \sum_{j=0}^{i-1} \binom{N-s_j}{i-j} - 2, \{s_j\}_{j=0}^{i-1}, 1 \leq s_j \leq N, s_j < s_{j+1}$$

$$\binom{x}{y} = \begin{cases} \binom{x}{y} & x \geq y \\ 0 & x < y \end{cases}, r \in \left\{0, \ldots \sum_{i=1}^{N} \binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{j-1}$ represents that the value of j is from 0 to $$i-1, \binom{x}{y}$$

represents $C_x^y$, that is, the number of combinations of selecting y elements in x elements, and r is the sending sequence index corresponding to the aggregated CQI.

18. The device according to claim 16, wherein the first determination module is further configured to determine the sending sequence of the aggregated CQI according to the following sequence: a sequence from 0 to $$\sum_{i=1}^{N} \binom{N}{i} - 1,$$

where N is the number of pieces of the CSI-RS configuration information and/or interference measurement information, i is the number of CSI-RS configuration resources and/or interference measurement resources for measurement in the aggregated CSI-RS configuration resources and/or interference measurement resources represented by the aggregated CQI.

19. A device for determining constituent of a channel state information reference signal (CSI-RS) configuration resource and/or interference measurement resource provided at a base station side, wherein the device comprises:
a second receiving module configured to receive an aggregated channel quality indication (CQI) sent by a terminal side;
a second determination module configured to search, in a receiving sequence list of aggregated CQIs pre-stored locally, for an aggregated CSI-RS configuration resource and/or interference measurement resource and determine the constituent of the aggregated CSI-RS configuration resource and/or interference measurement resource, wherein the receiving sequence list stores a receiving sequence of the aggregated CQI and the constituent of the aggregated CSI-RS configuration resource and/or interference measurement resource corresponding to the receiving sequence, and the receiving sequence and a sending sequence of the aggregated CQI are the same.

20. The device according to claim 19, wherein
the second receiving module is further configured to receive an aggregated CQI sent by the terminal side and an index corresponding to the aggregated CQI when the index corresponding to the aggregated CQI is further stored in the receiving sequence list;
the second determination module is further configured to search, in the receiving sequence list, for the receiving sequence of the aggregated CQI corresponding to the index according to the index corresponding to the aggregated CQI sent by the terminal side, and determine the constituent of the aggregated CSI-RS configuration resource and/or interference measurement resource corresponding to the aggregated CQI.

21. The device according to claim 19, wherein the second determination module is further configured to determine the receiving sequence of the aggregated CQI of each aggregated CSI-RS configuration resource and/or interference measurement resource using a preset algorithm according to the sending sequence of the CSI-RS configuration information and/or interference measurement information and the number of pieces of the CSI-RS configuration information and/or interference measurement information.

22. The device according to claim 21, wherein the second determination module is further configured to calculate the receiving sequence of the aggregated CQI according to the following formula:

$$r = \sum_{j=0}^{i-1} \binom{N - s_j}{i - j} + \sum_{k=0}^{i-1} \binom{N}{k} - 1, \{s_j\}_{j=0}^{i-1}, 1 \le s_j \le N, s_j < s_{j+1}$$

$$\binom{x}{y} = \begin{cases} \binom{x}{y} & x \ge y \\ 0 & x < y \end{cases}, r \in \left\{0, \ldots \sum_{i=1}^{N} \binom{N}{i} - 1\right\};$$

or, $$r = \binom{N}{i} + \sum_{k=0}^{i-1} \binom{N}{k} - \sum_{j=0}^{i-1} \binom{N - s_j}{i - j} - 2, \{s_j\}_{j=0}^{i-1}, 1 \le s_j \le N, s_j < s_{j+1}$$

$$\binom{x}{y} = \begin{cases} \binom{x}{y} & x \ge y \\ 0 & x < y \end{cases}, r \in \left\{0, \ldots \sum_{i=1}^{N} \binom{N}{i} - 1\right\}$$

where N is the number of pieces of the CSI-RS configuration information and/or interference measurement information, i is the number of CSI-RS configuration resources and/or interference measurement resources for aggregation measurement in the aggregated CSI-RS configuration resources and/or interference measurement resources represented by the aggregated CQI, $s_j$ is the sending sequence of the aggregated CSI-RS configuration resource and/or interference measurement resource corresponding to the aggregated CQI, j is a sequence index of the CSI-RS configuration resource and/or interference measurement resource for measurement in the aggregated CSI-RS configuration resources and/or interference measurement resources corresponding to the aggregated CQI, $\{s_j\}_{j=0}^{i-1}$ represents that the value of j is from 0 to $$i - 1, \binom{x}{y}$$

represents $C_x^y$, that is, the number of combinations of selecting y elements in x elements, and r is the sending sequence index corresponding to the aggregated CQI.

* * * * *